No. 748,567. PATENTED JAN. 5, 1904.
T. ADAMSON.
DISTANCE OR RANGE FINDING INSTRUMENT.
APPLICATION FILED APR. 8, 1903.
NO MODEL. 2 SHEETS—SHEET 2.

WITNESSES:
Edward Thorpe
E. E. Ellis

INVENTOR
Thomas Adamson
BY
ATTORNEYS.

No. 748,567.  
Patented January 5, 1904.

UNITED STATES PATENT OFFICE.

THOMAS ADAMSON, OF NEW YORK, N. Y.

DISTANCE OR RANGE FINDING INSTRUMENT.

SPECIFICATION forming part of Letters Patent No. 748,567, dated January 5, 1904.

Application filed April 8, 1903. Serial No. 151,671. (No model.)

*To all whom it may concern:*

Be it known that I, THOMAS ADAMSON, of the United States Navy, a citizen of the United States, and a resident of the city of New York, borough of Brooklyn, in the county of Kings and State of New York, have invented a new and Improved Distance or Range Finding Instrument, of which the following is a full, clear, and exact description.

This invention relates to distance or range finding instruments; and it consists, substantially, in the construction, organization, and combination of parts hereinafter particularly described, and pointed out in the claims.

Though applicable to other purposes in the arts, my improvements are intended more especially for use upon marine vessels and the like; and the principal object of the invention is to provide an instrument of this kind whereby the captain or other navigator of the vessel is enabled to ascertain at any time the distance of the vessel from a given distant point ahead—as a lighthouse, for instance—and also to likewise ascertain the distance the vessel will be from such point when abreast of the same.

A further object of the invention is to provide an effective and reliable instrument of the character referred to which is simple in its construction and organization, besides not liable to get out of order, and possessing the capacity for long and repeated service.

The above and additional objects are attained by means substantially such as are illustrated in the accompanying drawings, in which similar characters of reference indicate corresponding parts in all the views.

Figure 1:
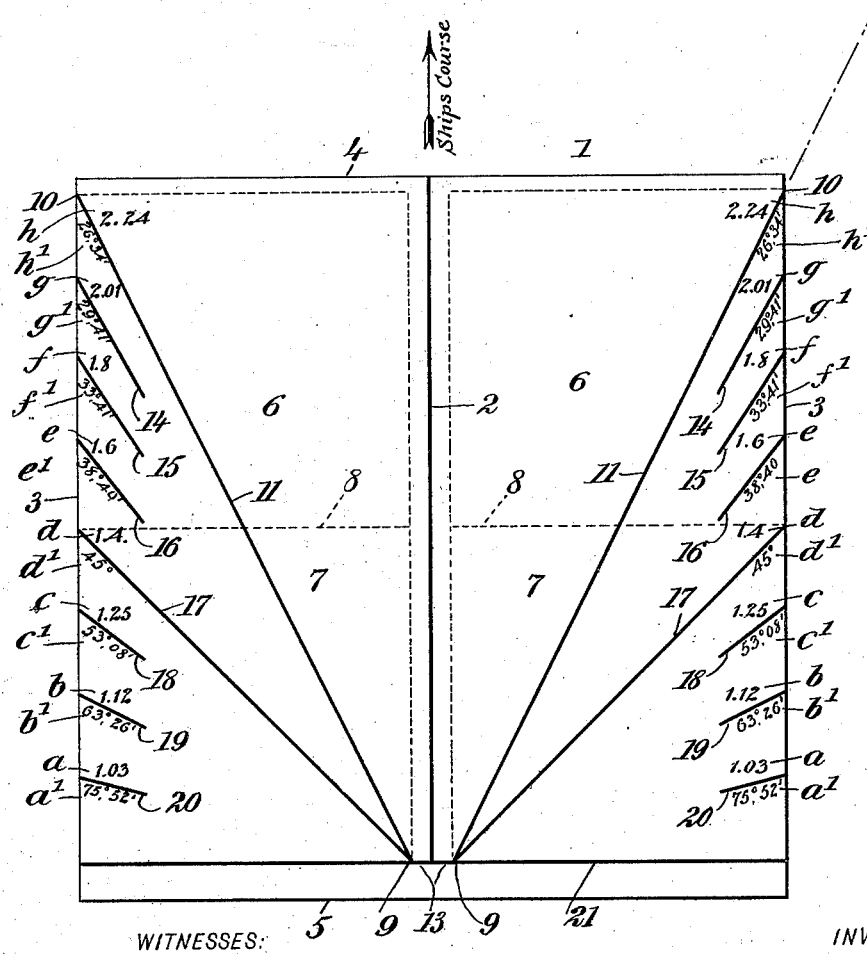
Figure 2:
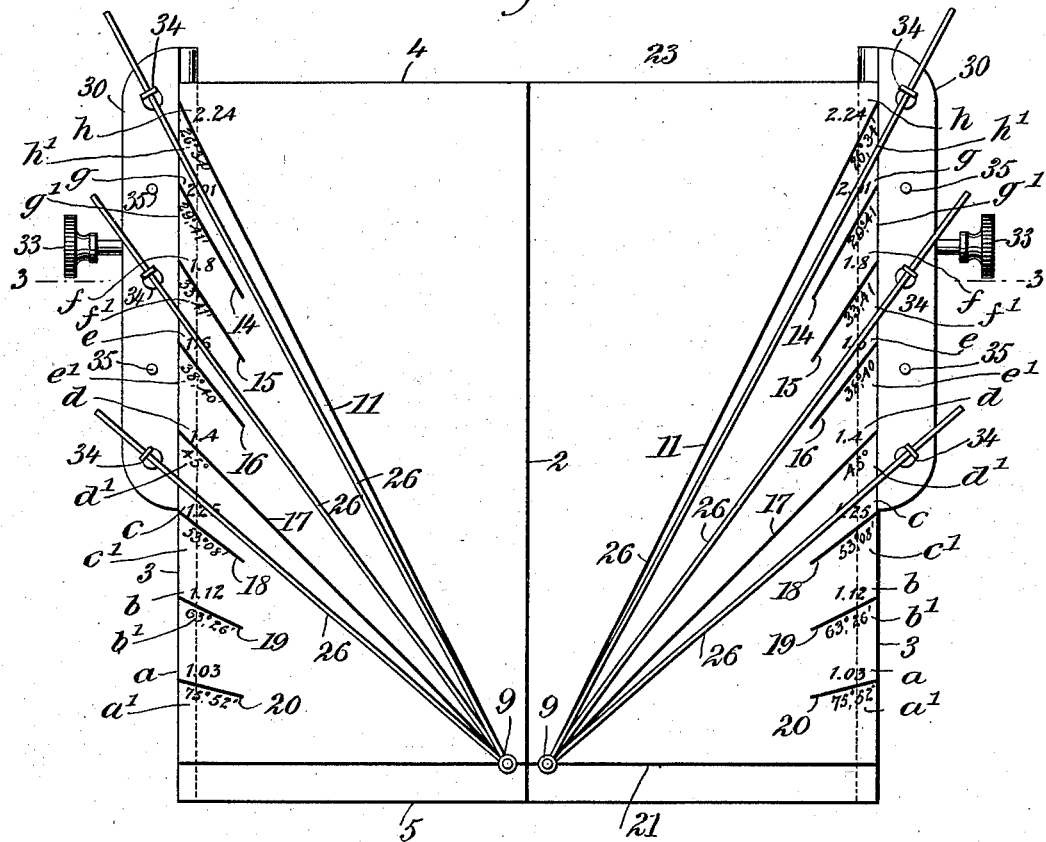
Figure 3:
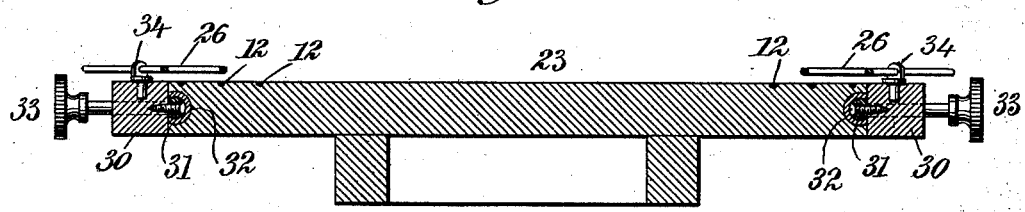

Figure 1 is a plan view of one embodiment of my improved device or instrument, said view illustrating a certain bearing or observation as having been taken by the navigator. Fig. 2 is a similar view of a slightly-different embodiment of the instrument, said view also indicating as having been taken a like observation or bearing to that shown in Fig. 1; and Fig. 3 is a transverse sectional view in detail representing the construction and organization of coöperative elements or parts of the instrument.

Before proceeding with a more detailed description it may be stated that my improvements are based upon the well-known principles of plane trigonometry, and in the embodiments thereof herein illustrated I preferably employ a board or chart, which in shape or configuration is practically a right-angled parallelogram made up of approximately two squares lying one in advance of the other in a horizontal plane, the said board or chart being mounted in position at any convenient and proper place on the vessel, as will be fully apparent from the description hereinafter following. In order that similar observations and calculations may be made from either side of the vessel with equal effect, I preferably construct the device or instrument in duplicate, and it will be understood, of course, that while I have herein represented a certain preferred embodiment of my improvements I do not intend to limit myself to the details thereof in practice, since immaterial changes therein may be made coming within the scope of my invention. The upper surface of the board or chart is of special embodiment, whereby the results desired may be had from the instrument, and in some instances I preferably employ specially constructed and organized movable elements or parts coöperatively applied to said board or chart, whereby the navigator is enabled to make somewhat more frequent observations and calculations than may be possible with the board or chart alone.

Specific reference being had to the drawings, and more especially to Fig. 1 thereof, the numeral 1 indicates the distance or range finding instrument in entirety, the same comprising substantially a square board or chart having the upper surface thereof centrally divided in the direction of the course of the vessel by a line 2, the said surface being thus practically constituted of duplicate oblongs or parallelograms, each made up by said line 2 and an outer edge 3 of the chart, together with equal parts of the forward and rearward edges 4 and 5, respectively, of said chart. Each of the parallelograms is in turn constituted or made up of approximately two squares 6 and 7, of which the dotted lines 8 constitute the division or separation, one of said squares being in advance of the other, as shown, relatively to the course or direction followed by the vessel, and intersecting the rearward inner angle 9 of each parallelogram with the most distant outer angle thereof is a diagonal pointer or indicator line 11, which practically divides the parallelogram into duplicate right-angled triangles, of each of which the said indicator-line 11 may be said to constitute the hypotenuse. This line and the lines 2 and 8, as well as all the other lines to be hereinafter mentioned, may be formed either by marking the surface of the chart in some contrasting color or else by both scoring and marking such surface, as shown at 12, for instance. These duplicate pointer or indicator lines 11 radiate from practically a common center 13, and at the outside of or to the right and left of each of them are additional lines, (indicated from 14 to 20, inclusive,) these said lines extending inwardly a suitable distance from the corresponding edge 3 of the chart, as shown, and those of each set or series being spaced apart for substantially equal distances, also as shown.

Formed or provided on the surface of the board or chart of the instrument, near to the rearward edge 5 of the chart, is also a line 21, which I denominate the "abreast" line, since the principal calculations or observations are made with reference to what the distance of the vessel will be from a lighthouse or other determinate object 22 ahead when said line is abreast of such object, this distance being termed the "beam" distance, as is understood.

By previous calculation I ascertain the value possessed by each of the diagonal lines referred to in its angular relation to the object and abreast line, and I denote such value alongside the line either decimally or otherwise, as indicated from $a$ to $h$, inclusive, and likewise I also place alongside each line a suitable character denoting different degrees of the course of the vessel—as indicated from $a'$ to $h'$, inclusive, for instance—and thus, as hereinafter mentioned, am I enabled also at any time to ascertain the bearing of the vessel.

It may be explained by way of example that when the moving vessel has reached a point in her course to bring the distant object 22 into coincidence with either of the pointer or indicator lines 11, for instance, a note is made in the log of the vessel, and then, supposing that at or about the time the object is caused (by continued travel of the vessel) to be brought into coincidence with, say, the line 15 (this line representing one-half the distance the vessel has to go to be abreast) it is desired to know what the beam distance will be, all that is necessary to do is to ascertain from the log how far the vessel has traveled in the interim, and if the log shows the distance to be, say, ten miles, then by simply doubling this distance the result will be twenty miles, of course, which is the distance the vessel will be from the object when passing abreast of the same, and in like manner may the desired result be obtained when the observation is made from any of the others of the said lines of either series thereof, as will be understood.

At the time of ascertaining the beam distance, as explained, if the value alongside the second line of observation be multiplied by the number expressing the beam distance then the distance of the object from the vessel on that line will also be had, and, moreover, it will also be seen that the characters alongside the said line indicating the degrees will also give the bearing of the ship.

As shown in Fig. 2, I also employ a board or chart 23, substantially identical in all respects with the one already described; but I also employ in connection with the set or series of lines of each parallelogram a set or series of rods 26, preferably shown as three in number (although the number may be varied) and which also radiate from practically a common center, at which they are pivoted, as shown, the rods of each set or series being adapted to be moved or swung into alinement or registry with the lines 11, 14, and 17, if desired, by which the same observation already described may be taken with the rods the same as with the lines; but the said rods are made use of more especially for observations at such times as the distant object 22 may be located intermediate of any two of such lines, as will be apparent. Thus the rods of each series are shown as in intermediate positions for such purpose, and it will be understood that the desired results may be easily obtained numerically by simple mental calculation. In order to move the rods of each series to any position desired, any suitable means may be employed, shown herein preferably in the form of a block or slide 30, each having on the inner face thereof a longitudinal substantially rounded offset or projection 31, fitting and working within a substantially semicylindrical guide 32 therefor, set within the material of the board or chart along the corresponding edge 3 thereof. Each slide is provided with a set-screw 33 or other means for securing the same at different positions of adjustment, and the upper surface of each slide is provided with a series of rotatable eyes or similar devices 34, through which the free ends of the rods work in the various movements imparted thereto in adjusting the slide for effecting different observations in the manner and for the purpose hereinbefore fully explained. The upper surface of each block is provided intermediate the rods with regularly-spaced pins or projections 35, by which observations may also be made similarly as by the rods themselves.

It will be noted that the surface of the board or chart at the inner side of the hypotenuse or line 11 of each of the right-angled triangles is plain or without lines or other characters, thus enabling calculations or observations to be readily made without confusion, as is apparent.

Having thus described my invention, I claim as new and desire to secure by Letters Patent—

1. A distance-finding instrument for marine vessels, comprising practically a parallelogrammic chart having thereon a diagonal line and an abreast line, said lines and an edge of the chart forming a right-angled triangle, the chart also having thereon other diagonal lines extending inwardly from said edge intermediate said first-mentioned diagonal line and the abreast line, each of the diagonal lines referred to having alongside thereof a numerical designation of the bearing of the vessel, on that line, and also having a similar designation of the angular relation of said line to a distant object and the abreast line, the surface of said chart, at the inner side of the first-mentioned diagonal line, being plain or devoid of lines.

2. A distance-finding instrument for marine vessels, comprising practically a parallelogrammic chart having thereon a diagonal line and an abreast line, said lines and an edge of the chart forming a right-angled triangle, the chart also having thereon other diagonal lines extending inwardly from said edge intermediate said first-mentioned diagonal line and the abreast line, each of the diagonal lines referred to having alongside thereof a numerical designation of the bearing of the vessel, on that line, and also having a similar designation of the angular relation of said line to a distant object and the abreast line, and said chart being further provided with a series of pivoted rods radiating substantially from the point of intersection of the abreast line with the said first-mentioned diagonal line, the surface of said chart, at the inner side of the first-mentioned diagonal line, being plain or devoid of lines.

3. A distance-finding instrument for marine vessels, comprising practically a parallelogrammic chart having thereon a diagonal line and an abreast line, said lines and an edge of the chart forming a right-angled triangle, the chart also having thereon other diagonal lines extending inwardly from said edge intermediate said first-mentioned diagonal line and the abreast line, each of the lines referred to having alongside thereof a numerical designation of the bearing of the vessel, on that line, and also having a similar designation of the angular relation of said line to a distant object and the abreast line, and said chart being further provided with a series of pivoted rods radiating substantially from the point of intersection of the abreast line with the said first-mentioned diagonal line, combined with means for simultaneously moving said rods, and means for securing them in different positions.

4. A distance-finding instrument for marine vessels, comprising practically a parallelogrammic chart having two of the most distant angles thereof intersected by a diagonal line, and provided with an abreast line, and also having other diagonal lines intermediate the first and said abreast line, each of said diagonal lines having alongside thereof a numerical designation of the bearing of the vessel, on that line, and also having a similar designation of the angular relation of said line to a distant object and the abreast line, and said chart being further provided with a series of pivoted rods radiating substantially from the same center as said diagonal lines, and adapted to be moved to different positions on the surface of the chart, and a slidable adjustable block with which the rods have movable connection.

5. A distance-finding instrument for marine vessels, comprising practically a parallelogrammic chart having two of the most distant angles thereof intersected by a diagonal line, and provided with an abreast line, and also having other diagonal lines intermediate the first and said abreast line, each of said diagonal lines having alongside thereof a numerical designation of the bearing of the vessel, on that line, and also having a similar designation of the angular relation of said line to a distant object and the abreast line, and said chart being further provided with a series of pivoted rods radiating substantially from the same center as said diagonal lines, and adapted to be moved to different positions on the surface of the chart, and a slidable adjustable block with which the free ends of the rods have movable connections, said block having on the upper surface thereof projections which are intermediate the rods.

In testimony whereof I have signed my name to this specification in the presence of two subscribing witnesses.

THOMAS ADAMSON.

Witnesses:
E. EVERETT ELLIS,
J. E. JONES.